United States Patent
Jhoney et al.

(10) Patent No.: US 11,188,984 B2
(45) Date of Patent: *Nov. 30, 2021

(54) AUTOMATION AND VALIDATION OF INSURANCE CLAIMS FOR INFRASTRUCTURE RISKS AND FAILURES IN MULTI-PROCESSOR COMPUTING ENVIRONMENTS

(71) Applicant: International Business Machines Corporation, Armonk, NY (US)

(72) Inventors: Albee Jhoney, Bangalore (IN); Hariharan Krishna, AnandBagh (IN); Anbazhagan Mani, Bangalore (IN); Umasuthan Ramakrishnan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 107 days.

This patent is subject to a terminal disclaimer.

(21) Appl. No.: 16/404,384

(22) Filed: May 6, 2019

(65) Prior Publication Data

US 2019/0259105 A1    Aug. 22, 2019

Related U.S. Application Data

(63) Continuation of application No. 15/334,762, filed on Oct. 26, 2016, now Pat. No. 10,332,212.

(51) Int. Cl.
*G06Q 40/08* (2012.01)
*G06Q 10/10* (2012.01)
(Continued)

(52) U.S. Cl.
CPC ......... *G06Q 40/08* (2013.01); *G06F 11/0709* (2013.01); *G06F 11/079* (2013.01);
(Continued)

(58) Field of Classification Search
CPC .... G06Q 40/08; G06Q 10/0635; G06Q 10/10; G06Q 30/0207; G06Q 40/06;
(Continued)

(56) References Cited

U.S. PATENT DOCUMENTS

| | | | | |
|---|---|---|---|---|
| 7,617,240 B2* | 11/2009 | Guyan | ...................... | G06F 9/46 705/4 |
| 2012/0271660 A1* | 10/2012 | Harris | .................... | G06Q 20/12 705/4 |
| 2014/0032249 A1* | 1/2014 | Kruglick | ................ | G06Q 40/08 705/4 |

OTHER PUBLICATIONS

Dialog Non-Patent Literatures (NPL) Search Report, dated Sep. 11, 2021. (Year: 2021).*

(Continued)

*Primary Examiner* — Hai Tran
(74) *Attorney, Agent, or Firm* — Heslin Rothenberg Farley & Mesiti P.C.; Michael A. Petrocelli, Esq.

(57) ABSTRACT

A method, computer program product, and system performing a method that includes a processor(s) obtaining a digital document defining insurance parameters for utilization by a user of a portion of computing resources selected from a group of computing resources comprising the shared computing environment. The processor(s) generates, based on the digital document, parameters defining the portion of the computing resources and risk management rules reflecting guaranteed thresholds for utilization and performance of the portion of the computing resources defined in the digital document. The processor(s) configures a controller in the shared computing environment, based on the parameters and the risk management rules and obtains a notification of a failure in the portion of the computing resources in violation of the risk management rules and details of the failure to (Continued)

determine the extent and impact of the failure. The processor(s) automatically generates a claim package and transmits it to the administrator.

20 Claims, 10 Drawing Sheets

(51) Int. Cl.
  *G06F 11/07* (2006.01)
  *G06F 11/30* (2006.01)
  *G06F 11/34* (2006.01)
(52) U.S. Cl.
  CPC ...... *G06F 11/0712* (2013.01); *G06F 11/0751* (2013.01); *G06F 11/0766* (2013.01); *G06F 11/0772* (2013.01); *G06F 11/3006* (2013.01); *G06F 11/3051* (2013.01); *G06F 11/3433* (2013.01); *G06F 11/3447* (2013.01); *G06F 2201/81* (2013.01); *G06F 2201/86* (2013.01)
(58) Field of Classification Search
  CPC ...... G06Q 40/02; G06Q 50/16; G06Q 20/102; G06Q 10/06; G06Q 10/1057; G06Q 30/018; G06Q 10/04; G06Q 10/063; G06Q 10/063118; G06Q 10/06393; G06Q 10/083; G06Q 10/0832; G06Q 10/0834; G06Q 10/0835; G06Q 10/20; G06Q 20/14; G06Q 20/223; G06Q 20/4016; G06Q 20/405; G06Q 30/012; G06Q 30/0202; G06Q 30/0206; G06Q 30/0283; G06Q 30/0643; G06Q 30/0645; G06Q 40/025; G06Q 50/01; G06Q 50/163; G06Q 10/047; G06Q 10/063112; G06Q 10/063114; G06Q 10/0639; G06Q 10/06398; G06Q 10/0833; G06Q 10/103; G06Q 10/105; G06Q 10/1053; G06Q 10/1095; G06Q 10/30; G06Q 20/02; G06Q 20/145; G06Q 20/29; G06Q 20/308; G06Q 20/3223; G06Q 20/3224; G06Q 20/3274; G06Q 20/3276; G06Q 20/36; G06Q 20/382; G06Q 20/401; G06Q 20/4012; G06Q 2220/00; G06Q 2240/00; G06Q 30/02; G06Q 30/0201; G06Q 30/0218; G06Q 30/0225; G06Q 30/0231; G06Q 30/0237; G06Q 30/0241; G06Q 30/0277; G06Q 30/0278; G06Q 30/04; G06Q 30/06; G06Q 30/0601; G06Q 40/00; G06Q 40/12; G06Q 40/123; G06Q 50/02; G06Q 50/165; G06Q 99/00
  USPC .......................................................... 705/4
  See application file for complete search history.

(56) References Cited

OTHER PUBLICATIONS

Google Scholar Search Report, dated Sep. 11, 2021. (Year: 2021).*
Mell et al., "The NIST Definition of Cloud Computing", National Institute of Standards and Technology, U.S. Dept. of Commerce, NIST Special Publ. 800-145, Sep. 2011, 7 pages.
List of IBM Patents or Patent Applications Treated as Related, May 21, 2019, 2 pages.

* cited by examiner

AUTOMATION AND VALIDATION OF INSURANCE CLAIMS FOR INFRASTRUCTURE RISKS AND FAILURES IN MULTI-PROCESSOR COMPUTING ENVIRONMENTS

BACKGROUND

Rather than invest in in-house information technology infrastructure, the emerging business environment is steadily moving away from making capital investments in information technology (IT) infrastructure towards consuming information technology (IT) resources as a service. As such, enterprises contract with cloud providers for Software as a Service (SaaS), Infrastructure as a Service (IaaS), and Platform as a Service (PaaS). SaaS provides the consumer with the capability of using the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings. IaaS provides consumers with the capability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). PaaS provides users with the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

The service-based model for IT solutions, including SaaS, IaaS, and PaaS, is referred to Anything as a Service (XaaS). An enterprise utilizes XaaS from a cloud provider and can on an as needed basis and pays based on usage. This model systemic changes for the vendor (of the IT Infrastructure) and the Provider (of XaaS infrastructure) to deliver support and services to the consumer. To this end, current contracts (between the cloud providers and consumers) include service level agreements (SLAs) that include and penalties to cover for losses. SLAs act as a deterrent for the provider to minimize loss. In addition to the existing SLA-driven penalty model to handle failures or deviation, there is also a business need for an Insurance-based model to recover the cost of impact due to failures/deviation.

In existing insurance-based models, a shared resource (e.g., cloud infrastructure) is consumed by a large number of users/enterprises, is faced with the risk of failures due to well-known causes (or adverse events such as an outage, performance degradation, loss/leakage/corruption, compliance issues, etc.) either due to an accident (natural or man-made) or prolonged exposure to risks (such as hackers, etc.). These failures lead to significant losses, including but not limited to, business interruptions for the consumers, loss of credibility for the provider, and/or loss of anticipated savings for the consumers. These losses are calculable and can be mitigated by insuring this shared resource and paying an affordable premium. However, anticipating and generating claims based on this insurance as well as validating these claims can be cumbersome and time-consuming.

SUMMARY

Shortcomings of the prior art are overcome and additional advantages are provided through the provision of a computer program product to automatically generate an insurance claim based on a failure in an insured computing resource of a shared computing environment. The computer program product comprises a storage medium readable by a processing circuit and storing instructions for execution by the processing circuit for performing a method. The method includes, for instance: obtaining, by one or more processors, from a computing resource of an administrator of a shared computing environment, a digital document defining insurance parameters for utilization by a user of a portion of computing resources selected from a group of computing resources comprising the shared computing environment; generating, by the one or more processors, based on the digital document, parameters defining the portion of the computing resources and risk management rules reflecting guaranteed thresholds for utilization and performance of the portion of the computing resources defined in the digital document; configuring, by the one or more processors, a controller in the shared computing environment, based on the parameters and the risk management rules, wherein based on the configuring, the controller continuously collects data and monitors operations from the portion of the computing resources and the controller determine whether a failure has occurred in the portion of the computing resources, based on the risk management rules; obtaining, by the one or more processors, from the controller, a notification of a failure in the portion of the computing resources in violation of the risk management rules; obtaining, by the one or more processors, from the controller, details of the failure comprising raw data from the data collected by the controller, to determine an extent of the failure and an impact of the failure; automatically generating, by the one or more processors, based on the raw data and the determination, a claim package; and transmitting, by the one or more processors, the claim package, to the computing resource of the administrator.

Shortcomings of the prior art are overcome and additional advantages are provided through the provision of a method of automatically generating an insurance claim based on a failure in an insured computing resource of a shared computing environment. The method includes, for instance: obtaining, by one or more processors, from a computing resource of an administrator of a shared computing environment, a digital document defining insurance parameters for utilization by a user of a portion of computing resources selected from a group of computing resources comprising the shared computing environment; generating, by the one or more processors, based on the digital document, parameters defining the portion of the computing resources and risk management rules reflecting guaranteed thresholds for utilization and performance of the portion of the computing resources defined in the digital document; configuring, by the one or more processors, a controller in the shared computing environment, based on the parameters and the risk management rules, wherein based on the configuring, the controller continuously collects data and monitors operations from the portion of the computing resources and the controller determine whether a failure has occurred in the portion of the computing resources, based on the risk management rules; obtaining, by the one or more processors, from the controller, a notification of a failure in the portion of the computing resources in violation of the risk management rules; obtaining, by the one or more processors, from the controller, details of the failure comprising raw data from the data collected by the controller, to determine an extent of the failure and an impact of the failure; automatically generating, by the one or more processors, based on the raw data and the determination, a claim package; and transmitting, by the one or more processors, the claim package, to the computing resource of the administrator.

Shortcomings of the prior art are overcome and additional advantages are provided through the provision of automatically generating an insurance claim based on a failure in an insured computing resource of a shared computing environment. The system includes a memory, one or more processors in communication with the memory, and program instructions executable by the one or more processors via the memory to perform a method. The method includes, for instance: obtaining, by one or more processors, from a computing resource of an administrator of a shared computing environment, a digital document defining insurance parameters for utilization by a user of a portion of computing resources selected from a group of computing resources comprising the shared computing environment; generating, by the one or more processors, based on the digital document, parameters defining the portion of the computing resources and risk management rules reflecting guaranteed thresholds for utilization and performance of the portion of the computing resources defined in the digital document; configuring, by the one or more processors, a controller in the shared computing environment, based on the parameters and the risk management rules, wherein based on the configuring, the controller continuously collects data and monitors operations from the portion of the computing resources and the controller determine whether a failure has occurred in the portion of the computing resources, based on the risk management rules; obtaining, by the one or more processors, from the controller, a notification of a failure in the portion of the computing resources in violation of the risk management rules; obtaining, by the one or more processors, from the controller, details of the failure comprising raw data from the data collected by the controller, to determine an extent of the failure and an impact of the failure; automatically generating, by the one or more processors, based on the raw data and the determination, a claim package; and transmitting, by the one or more processors, the claim package, to the computing resource of the administrator.

Additional features and advantages are realized through the techniques described herein. Other embodiments and aspects are described in detail herein and are considered a part of the claimed aspects. For example, in an embodiment of the present invention, the generating parameters and defining risk management rules further comprises: defining, by the one or more processors, a scope of use for each computing resource of the portion of computing resources, based on the digital document; implementing, by the one or more processors, the defined scopes in the parameters; defining, by the one or more processors, for each computing resource of the portion of computing resources, a risk profile, wherein the risk profile automatically detects failures in the computing resource when implemented by the controller of the shared computing environment; and implementing, by the one or more processors, the defined risk profiles in the risk management rules.

In an embodiment of the present invention, defining the scope of use for each computing resource of the portion of computing resources further comprises: determining, by the one or more processors, dependencies between each computing resource and each other computing resource of the portion of the computing resources; defining, by the one or more processors, services executed by the user on the portion of the computing resources; and mapping, by the one or more processors, each service of the services to at least one computing resource of the portion of computing resources.

In an embodiment of the present invention, determining the extent of the failure and the impact of the failure comprises: identifying, by the one or more processors, based on analyzing the dependencies, which computing resources of the portion of computing resources were affected by the failure; and based on identifying the computing resources affected by the failure, determining which services were affected by the failure.

In an embodiment of the present invention, determining an extent of the failure and the impact of the failure comprises applying at risk management rules selected from the group consisting of: threshold rules for the monitoring data to raise events based on a failure, event-correlation rules utilizing the dependencies to assist in determining a root-cause of the failures, and a fault-tree analysis with rules and constraints to utilize in determining an extent of the failure, and service usage rules to determine the impact of the failure utilizing the services.

In an embodiment of the present invention, the data collected by the controller is selected from a group consisting of: configuration audits performed on the portion of the computing resources, health events from the portion of the computing resources, and configuration changes made to the portion of the computing resources.

In an embodiment of the present invention, obtaining the notification of the failure further comprises: receiving, from the controller, data from logs of the portion of the computing resources.

In an embodiment of the present invention, the portion of the computing resources comprise physical infrastructure and software-defined infrastructure.

In an embodiment of the present invention, the method further comprising: analyzing, by the one or more processors, the raw data collected by the controller; and determining, by the one or more processors, based on the raw data, a root cause of the failure.

In an embodiment of the present invention, the method further comprises: automatically generating, by the one or more processors, a report detailing the root cause; and transmitting, by the one or more processors, the report to the administrator.

In an embodiment of the present invention, the shared computing environment comprises a cloud computing environment.

Shortcomings of the prior art are overcome and additional advantages are provided through the provision of a computer program product to automatically detect a failure of an insured computing resource in a shared computing environment to provide data to generate an insurance claim. The computer program product comprises a storage medium readable by a processing circuit and storing instructions for execution by the processing circuit for performing a method. The method includes, for instance: defining, by one or more processors in a shared computing environment, a risk profile for automatically detecting an event in each computing resource of the computing resources comprising the shared computing environment; accepting, by the one or more processors, over a communications network, from one or more programs of an automatic insurance claim generation software, a configuration comprising parameters identifying a portion of the computing resources of the shared computing environment comprising insured resources of a given user of the shared computing environment and risk management rules reflecting guaranteed thresholds for utilization and performance of the portion of the computing resources; based on accepting the configuration, continuously collecting data and monitoring operations, from the insured resources, by the one or more processors, to determine whether an event has occurred in the insured resources, based on the risk management rules and the risk profiles of the insured resources; and based on determining that the event has occurred, transmitting, by the one or more processors, to the one or more programs, a notification that the event has occurred, wherein the notification comprises a portion of the data collected by the one or more processors, wherein the portion comprises details of the event.

Shortcomings of the prior art are overcome and additional advantages are provided through the provision of a method to automatically detect a failure of an insured computing resource in a shared computing environment to provide data to generate an insurance claim. The method includes, for instance: defining, by one or more processors in a shared computing environment, a risk profile for automatically detecting an event in each computing resource of the computing resources comprising the shared computing environment; accepting, by the one or more processors, over a communications network, from one or more programs of an automatic insurance claim generation software, a configuration comprising parameters identifying a portion of the computing resources of the shared computing environment comprising insured resources of a given user of the shared computing environment and risk management rules reflecting guaranteed thresholds for utilization and performance of the portion of the computing resources; based on accepting the configuration, continuously collecting data and monitoring operations, from the insured resources, by the one or more processors, to determine whether an event has occurred in the insured resources, based on the risk management rules and the risk profiles of the insured resources; and based on determining that the event has occurred, transmitting, by the one or more processors, to the one or more programs, a notification that the event has occurred, wherein the notification comprises a portion of the data collected by the one or more processors, wherein the portion comprises details of the event.

Additional features and advantages are realized through the techniques described herein. Other embodiments and aspects are described in detail herein and are considered a part of the claimed aspects. For example, in an embodiment of the present invention, the continuously collecting the data comprises collecting data selected from the group consisting of: configuration audits performed on the portion of the computing resources, health events from the portion of the computing resources, and configuration changes made to the portion of the computing resources.

In an embodiment of the present invention, the shared computing environment comprises a cloud computing environment and the one or more processors comprise a controller of the cloud computing environment.

Methods and systems relating to one or more aspects are also described and claimed herein. Further, services relating to one or more aspects are also described and may be claimed herein.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
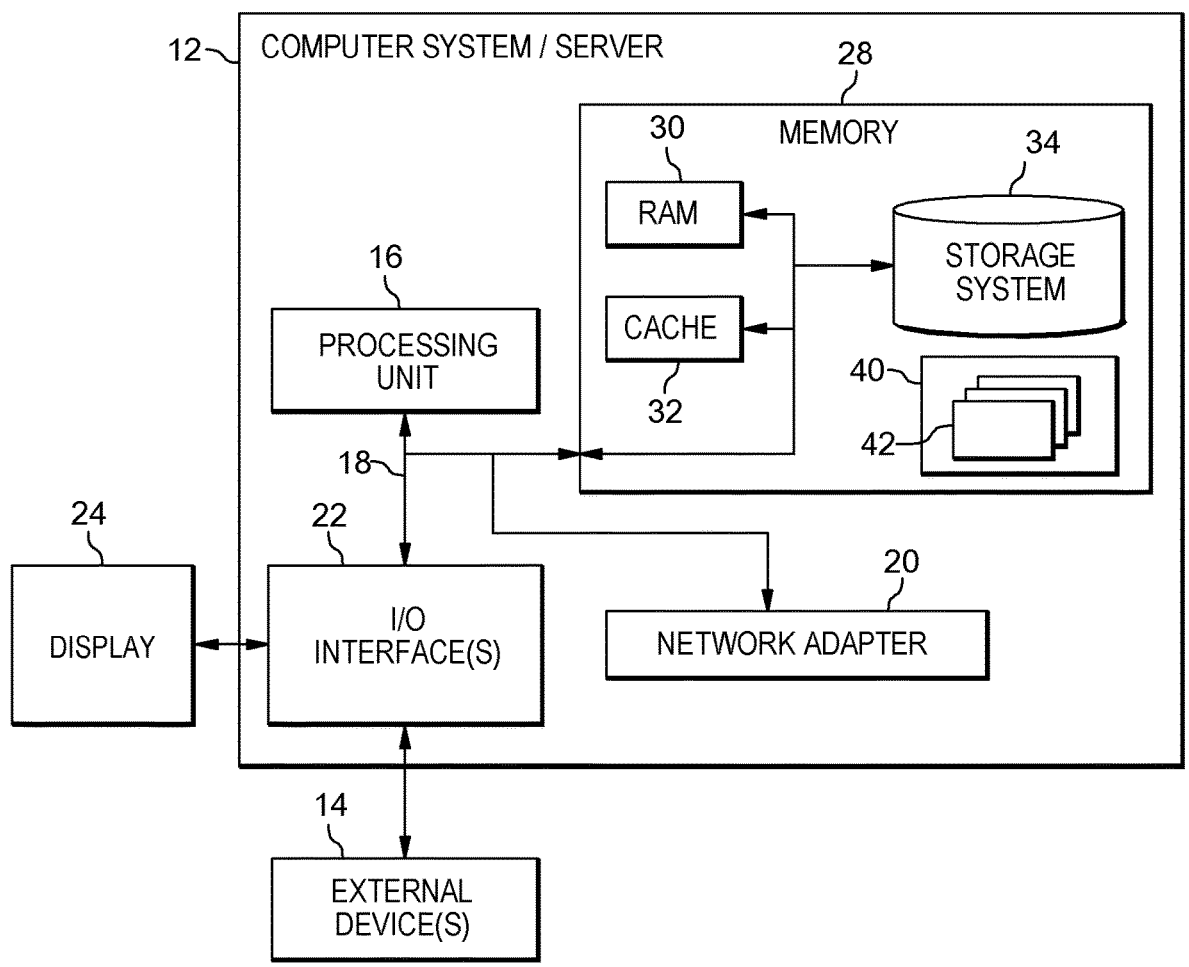
FIG. 1 depicts one embodiment of a computing node that can be utilized in a cloud computing environment.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code.

In the event of a failure (or deviation) in cloud infrastructure, embodiments of the present invention provide a computer system, computer program product, and computer-implemented method in which one or more programs automatically detect the occurrence of the failure (or deviation) event and the risks selected in the insurance policy, prepare a claim document (along with the supporting document) in an automated manner, in order to indemnify the insured against the loss covered in the insurance policy, file and/or submit the claim (including the supporting document) to the insurer in a secure and automated manner. Embodiments of the present invention also include a computer system, computer program product, and computer-implemented method in which one or more programs validate the claim, while the system is recovering from failure and/or after the system has recovered from failure.

In order to generate an insurance claim based upon a failure, aspects of embodiments of the present invention include programs that automate the generation and injection of the cloud-monitoring policies into a cloud monitoring tool, in order to collect relevant IT data (e.g., describing the cloud resources and services) based on identifying coverage in an insurance contract/policy. Embodiments of the present invention improve the effectiveness of data collection and interpretation within a cloud computing system (and/or any shared computing environment where data management is essential to meeting performance goals). Aspects of embodiments of the present invention obtain, interpret, and formulate data from an insurance contract to create a definition that can be utilized by the cloud computing system. For example, program code, executing on at least one processing resource, in embodiments of the present invention, generates a Cloud Monitoring/Data Collection Policy, which will be discussed herein, to provide selective monitoring based on the usage of a user of cloud computing resources. The program code obtains a given contract or policy, which is provided in a digital format, and automatically generates a Cloud Monitoring/Data Collection Policy for all the underlying resources that are used by the insured resources/services, identified in the insurance contract. The program code can then monitor only the relevant underlying resources to obtain data it utilizes for analysis and preparation of a claim package.

Embodiments of the present invention represent improvements to the functionality of a shared computing environment by automatically identifying faults that are relevant to certain users, for example, by ensuring that the relevant fault-events (utilized to automatically generate claims) originate from the insured resources/services (i.e., based on the faults enlisted in the insurance contract) identified for a user. Because the program code can make this determination by monitoring in accordance with the Cloud Monitoring/Data Collection Policy, the program code can automatically generate a claim when an event is detected, rather than generating a lot of events, and then filtering them later, while preparing the claim package. Thus, embodiments of the present invention provide a computer system, computer program product, and computer-implemented method that automates the generation and injection of threshold rules to an IT risk analysis tool, to detect potential failures/faults in the cloud resource/services, based on the coverage identified in an insurance contract. Thus, program code in an embodiment of the present invention automatically generates relevant parameters for use in detecting failures/faults originating from the insured resources/services (or from the underlying resources), instead of detecting all possible failures/faults from all possible cloud resources. The program code notifies of a fault/failure when an event meets the parameters.

Embodiments of the present invention represent an improvement in fault detection on a per-user or per-entity basis in a shared computing environment because program code automatically correlates and de-duplicates relevant fault-events originating from the different insured Services/Resources (based on the faults enlisted in the insurance contract), instead of generating a lot of events, and then correlating/de-duplicating them later, while preparing a claim package. Specifically, embodiments of the present invention provide a computer system, computer program product, and computer-implemented method that automates the generation and injection of event-correlation rules into an IT risk analysis tool to de-duplicate and correlate failure events. By automatically correlating events, the program code can identify root cause of the failures/faults in the cloud resource/services, based on the coverage identified in an insurance contract. In an embodiment of the present invention, the program code automatically generates relevant parameters to rapidly perform root-cause analysis for the events originating from the insured resources/services (or from the underlying resources) identified in the insurance contract. Generating and utilizing these parameters eliminates the need to sift through all possible failures/faults from all possible cloud resources in a shared computing system.

Aspects of certain embodiments of the present invention represent an improved (automatic) approach to identifying all the insured resources/services that will be affected, due to the fault-event, rather than manually making these identifications, as is done in existing computing environments. Instead of a manual solution, embodiments of the present invention provide a computer system, computer program product, and computer-implemented method that automates the generation and injection of fault-tree analysis rules to the IT risk analysis tool to identify all the dependent the cloud resource/services that will be affected due to a failure, based on the coverage identified in the insurance contract. In an embodiment of the present invention, program code automatically generates relevant parameters for use in determining all the insured resources/services that will be affected due to a failure/fault in an underlying (or dependent) insured resources/services and validates the determination.

Aspects of certain embodiments of the present invention improve the efficacy of a multi-user computing environment by computing the business impact of failure to the insured resources/services in an automated manner, rather than utilizing existing manual approaches. Instead of manually trying to do so, while preparing the claim package. Embodiments of the present invention include a computer system, computer program product, and computer-implemented method where program code is utilized to automate computation of business impacts, due to the failure, based on the coverage identified in the insurance contract. These impacts are utilized by the program code in formulating an insurance claim based on a given policy. The program code automatically generates relevant parameters used to compute the impact of failure/fault in the insured resources/services. In an embodiment of the present invention, these parameters are part of an input insurance contract definition.

Aspects of certain embodiment of the present invention represent improvements to the monitoring and data-collection for preparing a claim package. Embodiments of the present invention include a computer system, computer program product, and computer-implemented method in which program code identifies and monitors cloud resources/services that are relevant for the established insurance contract. The program code is able to differentiate resources and based on obtaining data from the insurance contract, monitors only the insured resources/services (and the underlying resource dependency), identified in the insurance contract (instead of all the cloud resources). Based on this strategic monitoring, the program code can raise events for only those fault/failure identified in the insurance contract and can also correlate/de-duplicate the failure events to determine the root-cause event identified in the insurance contract. In an embodiment of the present invention, the program code generates and performs selective monitoring of pre-determined fault/failure events from target resources, as defined in the insurance contract.

Aspects of embodiments of the present invention represent improvements over existing fault recognition methods because these aspects improve the effectiveness of the analyzing the business service model to determine the extent of failure and impact of failure, while preparing a claim package. Embodiments of the present invention include a computer system, computer program product, and computer-implemented method to automate the analysis of the fault data, to determine the extent of failure & impact of failure.

Program code in an embodiment of the present invention automatically determines the extent of failure using, for example, a fault-tree (based on the business service model) due to a failure-events. The program code makes this determination based on the resources and the failures enlisted in the insurance contract. In an embodiment of the present invention, the program code automatically determines the impact of failure using the business service usage model/rules for the resources and failure identified in an insurance contract. These determinations enable the program code to perform failure-coverage analysis and failure-impact-analysis for the cloud resources and failure events enlisted in the insurance contract, in the cloud resources domain.

An advantage of certain embodiments of the present invention is that they enable third-party administrators to scale and operate across multiple cloud environments (public, private, hybrid, etc.) to automate the generation of claim packages. Embodiments of the present invention include a computer system, computer program product, and computer-implemented method that include program code that automatically initiates localized analysis of failures in cloud resources/services based on an established insurance contract. The program code uploads all the relevant fault data (e.g., to an online claim preparation service) in order to prepare an insurance claim package. In an embodiment of the present invention, these tasks used to prepare insurance claim can be accomplished in different computing environments as certain tasks can be performed in a remote cloud environment, and other tasks can be performed in a shared/hosted software service (referred to as the Online Claims Service). For example, monitoring policy parameters and parameters for analysis of rules can be generated by program code executing on a resource in the hosted Online Claims Service. Meanwhile, program code executing on a resource of a remote cloud environment (referred to a Cloud Monitoring Infra—CMI) engages in real-time monitoring, detecting failures, and recovery from failures steps. In an embodiment of the present invention program code in the hosted Online Claims Service performs analysis to determine the extent of a failure and the impact of a failure and automatically generates a claim package.

An advantage of an embodiment of the present invention is that it provides an Insurance Provider with the ability to validate/non-repudiate a claim package that was prepared, for a failure in the insured cloud resource/service. Embodiments of the present invention include a computer system, computer program product, and computer-implemented method that includes program code that consolidates raw-data and results of IT risk/fault analysis that was used to prepare the final claim package, which the insurer can utilize to for non-repudiation during a claim validation phase. The program code, in an embodiment of the present invention, collect raw-data, analyzes the same, and automatically generates an outcome of the analysis in the form of a final claim package in an automated manner; the claim is for failure in an insured cloud resource/service.

In an embodiment of the present invention, an illustrative (and non-limiting) example for a cloud service failure is an interruption due to a network and/or routing issue. In this scenario, based on the failure, a user of the computing environment is unable to access a business critical customer relationship management (CRM) application for a given period of time, for example, three hours. The impacts to the user include a loss of capital. Thus, the user desires to make a claim for the covered amount of loss, and can make this claim with the following documents proof of the failure, proof of the cause for failure (same as the risks mentioned in the insurance policy), proof of business impact, proof of periodic health audit and health service, and proof of compliance.

As shown in FIG. 1, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
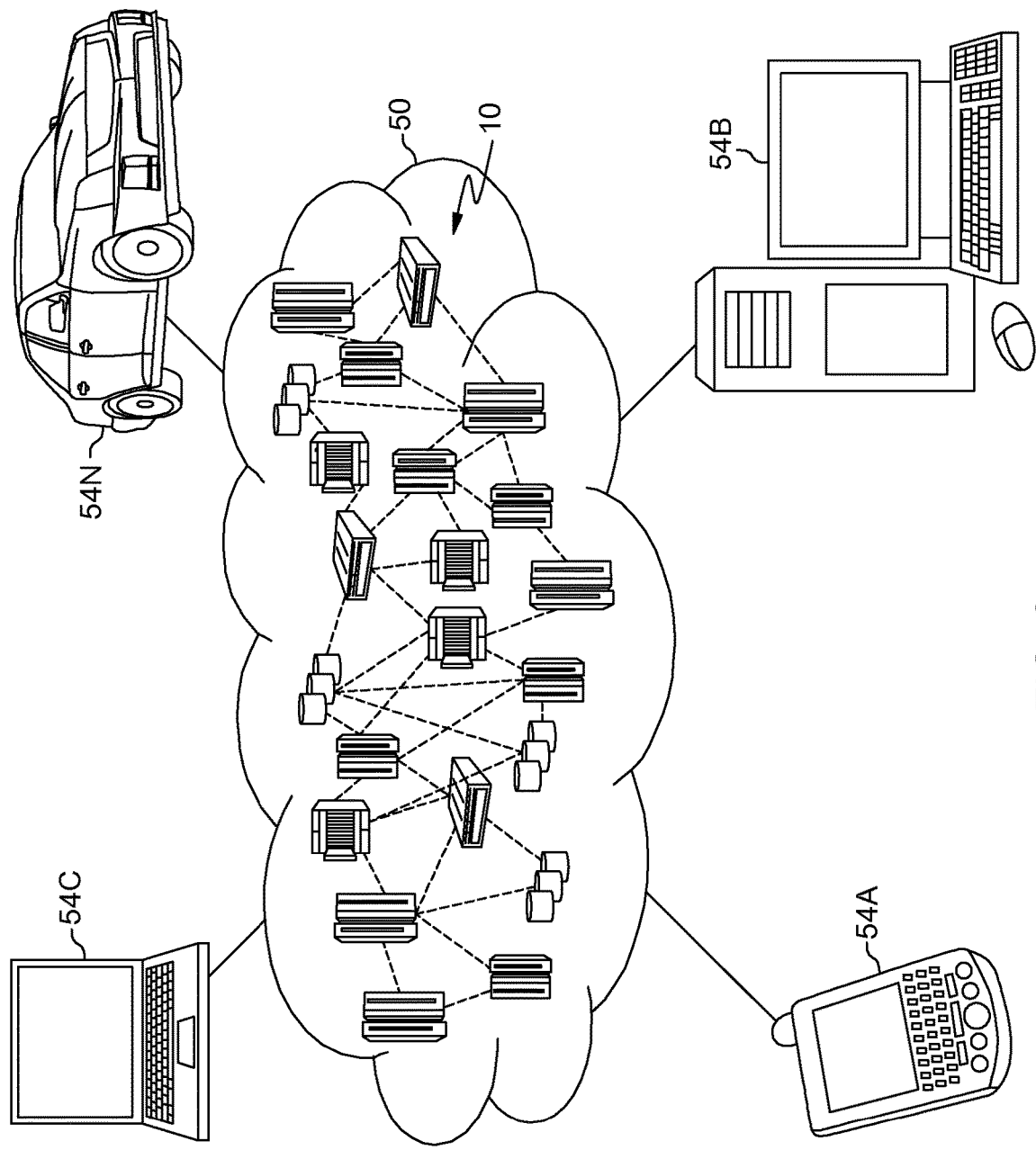
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
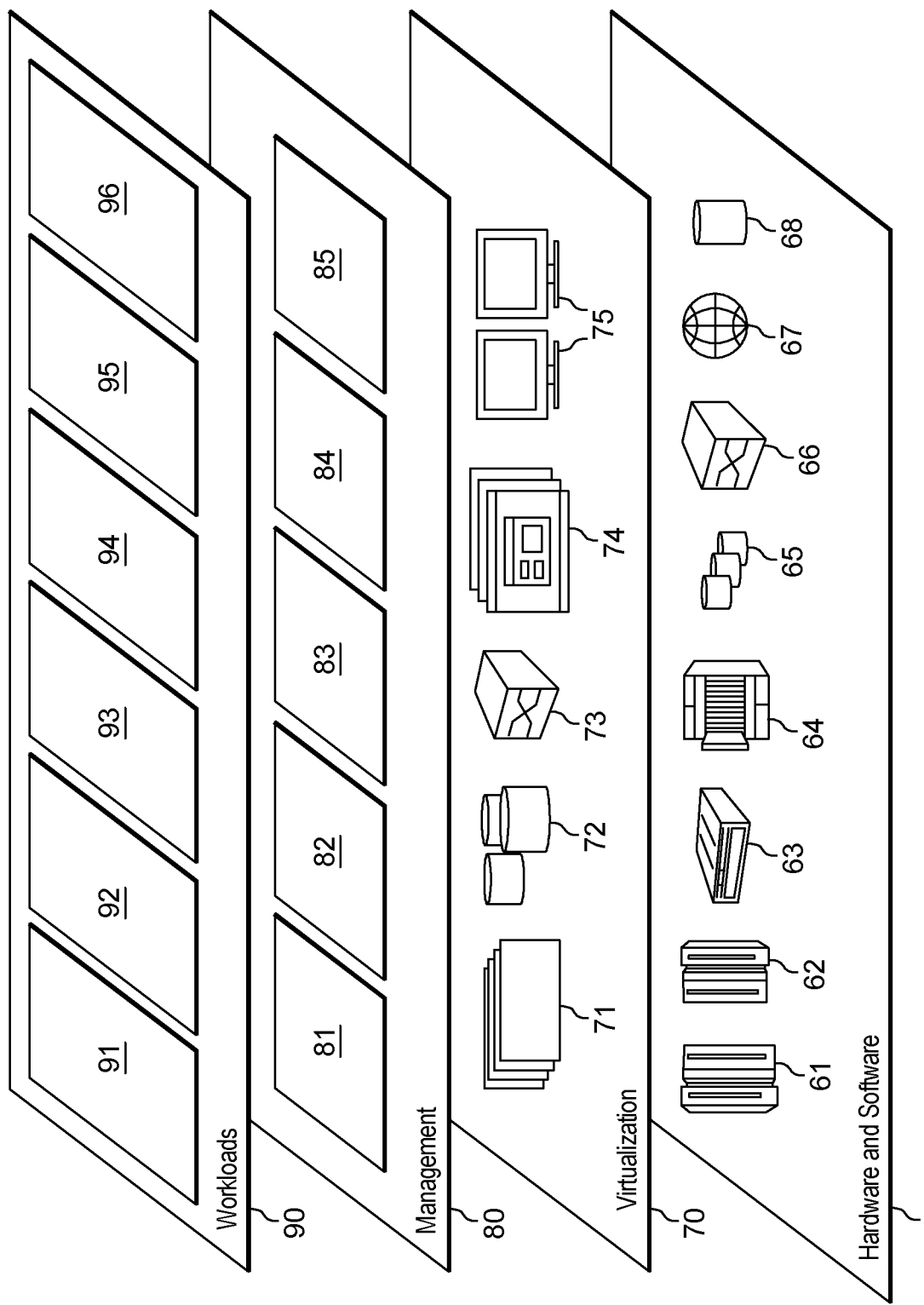
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and initiating and/or automatically generating and/or validating an insurance claim based on failures related to usage of cloud resources defines by an insurance contact 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
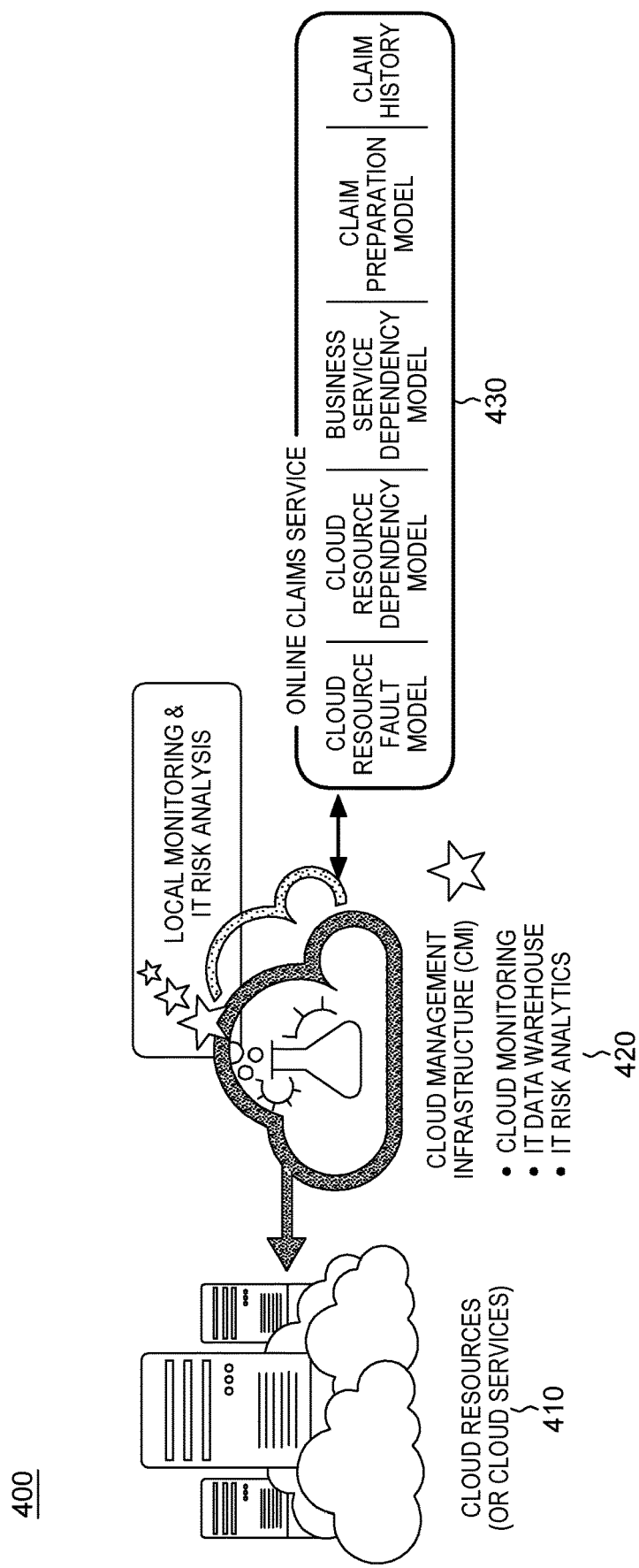
FIG. 4 depicts a cloud computing environment according to an embodiment of the present invention.

In order to illustrate various aspects of embodiments of the present invention, FIG. 4 provides a high level overview of functionalities in a cloud computing environment 400. The elements in FIG. 4 are referenced throughout the workflow 500 of FIG. 5 in order to illustrate the aspects discussed.

Returning to FIG. 4, a cloud computing environment 400 includes cloud resource 410, which can also be referred to as cloud infrastructure. Cloud resources, i.e., computing resources, that comprise the infrastructure of a cloud computing environment 410 include, but are not limited to, servers (e.g., physical servers that are utilized as host machines for guests, virtual machines (VMs)), virtualization technologies (i.e., technologies that abstract physical elements and location and present servers, applications, desktops, storage, and networking that is uncoupled from physical devices and presented as logical resources), storage (e.g., storage area networks, network attached storage (NAS), and unified systems), networking elements (e.g., switches to interconnect physical servers and storage), infrastructure management (e.g., server, network, and storage orchestration, configuration management, performance monitoring, storage resource management, and usage metering), applications, and/or infrastructure systems (e.g., pre-integrated software and hardware). The cloud resources 410 include both a physical (non-virtual) infrastructure (e.g., servers, network, storage, power, etc.) and well as software defined infrastructure. The software defined infrastructure utilizes virtualization capabilities of the resources in the physical infrastructure to combine and compose a new dynamic virtual resources (e.g., virtual machines, virtual data-centers, etc.). Unlike resources of the physical infrastructure, software-defined resources can elastically scale based on the needs of applications or business workload executing on these resources. The virtual resources may be created by scripts and software in the cloud resources 410, referred to as infrastructure patterns, which dynamically compose a virtual infrastructure for a pre-defined workload.

The cloud computing environment 400 also includes a cloud management infrastructure (CMI) 420, which is sometimes referred to as a cloud controller. The CMI includes programs that monitor the resources 410 of the cloud computing environment 400, provide IT data warehouses, and IT risk analysis services. The program code performing risk management may be referred to as a risk management tool. In an embodiment of the present invention, one or more programs in the CMI periodically collect critical metrics, key performance indicators and log data; store them in a warehouse. One or more CMI 420 programs analyze the historical and real-time data to plan and execute manual or automated corrective and preventive procedures that maintain the stability and optimal state of the cloud resources 410, including the software-defined infrastructure, and the physical infrastructure.

As will be discussed in greater detail herein, program code executing on at least one processing resource, Online Claims Service 430, configures the CMI 420 with various data based in an insurance policy/contract. Items that contribute to the configuration may include a monitoring policy (to monitor relevant resources), log data collection policy (to collect log data from relevant resources), threshold settings (for detecting relevant events), and event-correlation rules (for determining root-cause). In an embodiment of the present invention, the program code of the Online Claims Service 430 verifies and updates the CMI 420 configuration settings (to ensure that the CMI configuration is not tampered and are synchronized with any changes in the cloud resource 410). The program code of the Online Claims Service 430 may utilize certain templates when configuring the CMI 420, relevant to each type of insured resource and the related adverse events, including but not limited to: a monitoring policy template, a log data-collection policy template, a threshold rule template. In an embodiment of the present invention, the program code may maintain a copy of the insurance contract, in machine readable format.

As will be discussed in greater detail below, the program code of the Online Claims Service 430 interacts with the CMI 420 to periodically fetch cloud resource models from the CMI 420, including but not limited to, cloud resource dependency models (using discovery tools), business Service dependency models (business service tree, along with business service usage and accounting details). The program code also interacts with the CMI 420 after a failure to assess the extent of failure and impact of failure in order to prepare the claim package. The program code may obtain data indicating one or more of the following: failed resource (root-cause resource that failed), failed event (root-cause failure event), periodic health audit performed on the cloud resource and CMI, and configuration changes made to the cloud resources and CMI.

Figure 5:
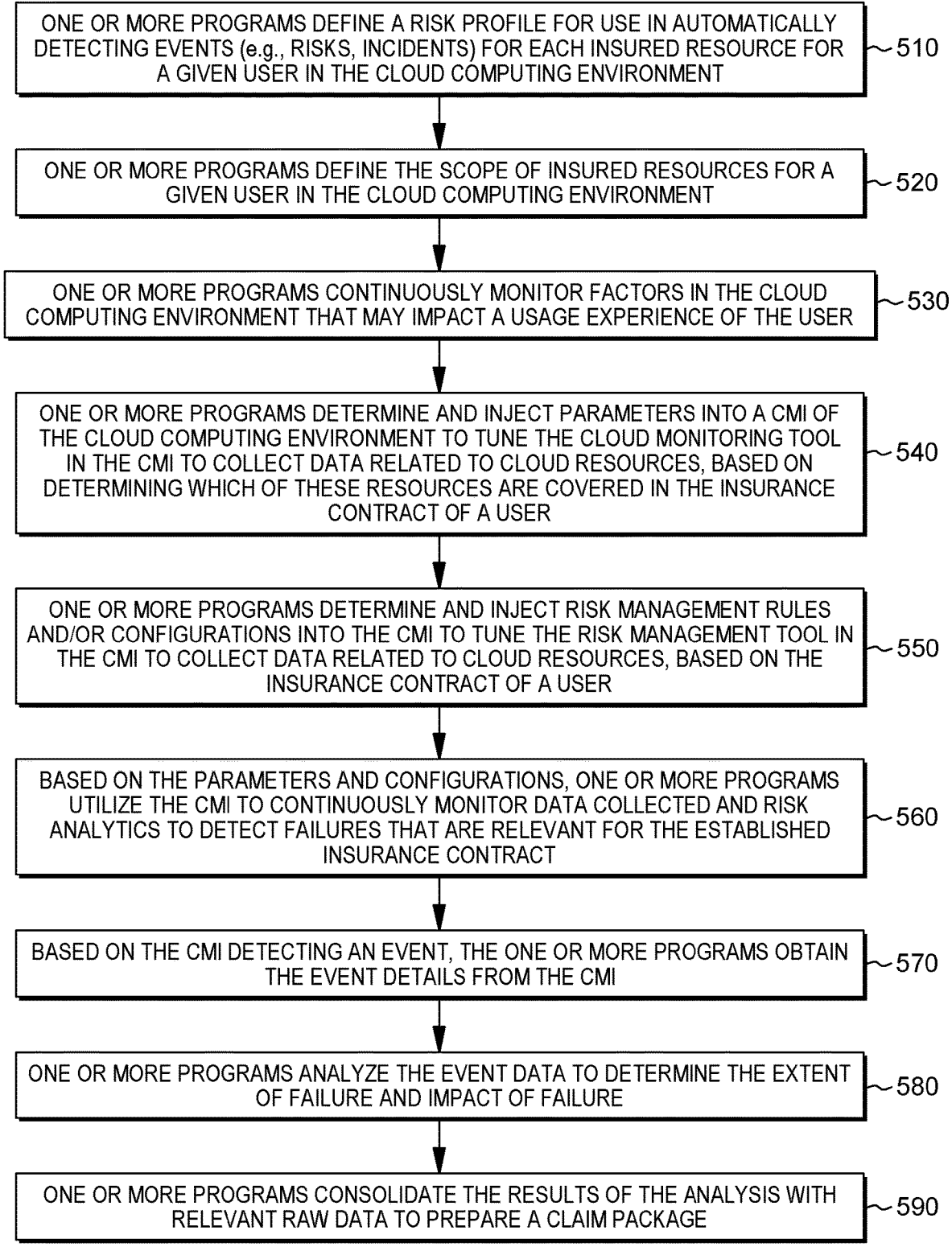
FIG. 5 depicts a workflow illustrating certain aspects of an embodiment of the present invention.

Referring now to FIG. 5, FIG. 5 is a workflow 500 that illustrates certain aspects of an embodiment of the present invention. In an embodiment of the present invention, program code, which can take the form of trusted third-party application services prepares and submits claims online. These claims assist the cloud computing controller (e.g., CMI 420, FIG. 4) in tuning the cloud computing environment 400 by collecting relevant data, analyze the data, and automatically preparing the insurance claim. The workflow of FIG. 5 illustrates how one or more programs executing on a computing resources that can either be interior or exterior to the cloud computing environment 400 (FIG. 4) automatically prepares an insurance claim. Although the workflow 500 is discussed with references to its application in a cloud computing environment 400 (FIG. 4), the aspects illustrated are applicable to any shared computing environment.

In an embodiment of the present invention, the program code (which may include one or more programs), defines a risk profile for use in automatically detecting events (e.g., risks, incidents) for each insured resource (510). In an embodiment of the present invention, the risk profile includes a data definition defining the data that would indicate an event, data defining a recovery, and a maximum time-interval between the incident and full recovery. These risk profiles can be thought of as comprising a fault model related to the resources of a cloud computing environment 400 (FIG. 4).

In an embodiment of the present invention, in order to define a risk profile for a given resource, the program code prepares a data-collection policy template for the resource. This profile includes both parameters for monitoring the resource as well as fault tolerance related to the resource. For example, if the resource comprises network elements, risk coverage for the resources may include network interruption risk for the lost revenue due to network interruption/disruptions of a pre-defined period of time, due to failures in the network elements. A data collection policy can follow a template defining: target resource, metrics, frequency of collection, summarization, and/or persistence. These values for the network elements example include a target resource of all network elements (physical and software-defined), metrics of network availability and Simple Network Management Protocol (SNMP) event log, frequency of collection can be every $XX per 4 mins (minimum 4 samples), summarization can be hourly, and persistence can be for 6 months.

In an embodiment of the present invention, the program code defines a fault-notification rule template for monitored attributes to aid in fault detection. In the network resource example above, the fault-notification rule template may include metrics, such as network availability and SNMP event log, a fault-trigger, for example, if and SNMP event for the resource contains "Link Down" and if network availability metrics for the resource contain "device not responding" or "device general error." The template may also include a normal trigger, such as if a SNMP Event for the resource contains "Link Up" when network availability metrics for the resource contain no error.

Returning to FIG. 5, in an embodiment of the present invention, the program code defines the scope of insured resources for a given user in the cloud computing environment 400 (FIG. 4) (520). In order to define the scope, in an embodiment of the present invention, the program code obtains data related to the computing environment within the cloud computing system utilized by the user, for which the user carries insurance defining availability requirements and scope of the resources. In an embodiment of the present invention, the program code dynamically fetches data related to the IT and business environment of a user (who is insured), either from the resources themselves or from authorized data sources that describe the resources. Based on obtaining this data, the program code determines which resources of the cloud computing environments are covered by an insurance contract of the user. The program code may take a snapshot of the current configuration for comparison in case of an event (e.g., a failure). In an embodiment of the present invention, the program code determines the dependencies between resources relevant to the contract (e.g., applications, middleware, servers, networks, storage, etc.). The program code may define the user's critical business services and critical business transactions and map these to the insured underlying cloud resources 410 (FIG. 4) utilized by the user to perform these functions. In an embodiment of the present invention, the program code defines a business impact for each business service outage, as a function of revenue, profit or business key performance indicator (KPI) and the business impact for each deviation or degradation of a transaction, as a function of the revenue, profit or business KPI.

The insurance contracts referred to in this application refer to digital documents that define a scope of resources to be utilized by a cloud computing system user and the performance expectations for those resources. For example, a user may possess an insurance contract that insures a network utilized by a CRM application and defines an adverse event as a network outage exceeding one hour. The insurance contract defines that claims related to the contract can be made on an hourly basis (for the CRM application). An example of a failure scenarios that could lead to insurance claims in an embodiment of the present invention include a cloud service outage due to a network and routing issue for a pre-defined period of time (e.g., 3 hours) that impacts the user because the user is unable to access a business critical applications (CRM, billing, etc.) the span of the outage. In this situation, program code in an embodiment of the present invention would detect this event and automatically generate a claim for the covered amount of loss, with the following documents: proof of the failure, proof of the cause for failure (same as the risks mentioned in the insurance policy), proof of business impact, proof of periodic health audit & health service, proof of compliance, etc.

Embodiments of the present invention can accommodate a variety of different types of insurance contracts. Some insurance contracts for which embodiments of the present invention can automatically generate claims include contracts that define response-time in the event of performance failures. An example of this type of contract would define an insured resource (e.g., web applications servers utilized for an ecommerce application) and an adverse event (e.g., a response time of great than five minutes for more than an hour), and claims parameters for response-time deterioration (e.g., on an hourly basis for the ecommerce application). Insurance contracts may also define transaction failures (e.g., in database, storage, etc.). An example of this type of contract would define an insured resource (e.g., a database used by the railway ticketing application) and an adverse event (e.g., a valid transaction failed repeatedly a pre-defined number of times), and claims parameters for the failed transactions (e.g., on the basis of an estimated number of failed transaction (using historical data) and the estimated cost of each transaction made by the ticketing application). An insurance contract may also cover deterioration in transaction rate due to inadequate capacity. For example, the insured resource in this type of contract could be a server used by a messaging application. An adverse event is defined as the server capacity, CPU and network utilization of greater than 98% for more than thirty minutes. The program code would claim capacity failures on the basis of estimated deterioration in the number of messages processed or transaction rate (using historical data) and the estimated loss due to the lesser available capacity. Insurance contracts may also insure unreliable resources (such as network interruptions).

Returning to FIG. 5, in an embodiment of the present invention, the program code continuously monitors factors in the cloud computing environment 400 (FIG. 4) that may impact a usage experience of the user (530). As part of monitoring the resources, the program code may fetch data related to the cloud computing system and its resources at pre-defined time intervals. For example, the program code, in an embodiment of the present invention, fetches a history of configuration audits performed on the cloud resources 410 (FIG. 4), a history of health events from the insured cloud resources 410 (FIG. 4), and/or a history of configuration changes made to the cloud resources 410 (FIG. 4).

In an embodiment of the present invention, the program code dynamically fetches details about the insured resources. To this end, the program code may discover elements in the cloud environment 400 (FIG. 4) and the dependencies between then, and generated a resource dependency model as a Bayesian network. The program code may define a business dependency model as a collection of critical business services and its dependent applications (or IT resources) in the cloud environment 400 (FIG. 4), a collection of critical business transaction and its dependent application transaction/application leveraging the underlying cloud resources that are insured. The program code may define the business impact for each business service and/or business transaction as a function of revenue or business KPI. The program code may annotate a business service model that it generates with information about the biz-revenue (or biz-KPI) or biz-revenue-API.

Returning to FIG. 5, in an embodiment of the present invention, the program code (e.g., Online Claims Service 430) determines and injects parameters into the CMI 420 (FIG. 4) of the cloud computing environment 400 to tune the cloud monitoring tool in the CMI to collect data related to cloud resources 410 (FIG. 4) based on determining which of these resources are covered in the insurance contract of a user (540). In an embodiment of the present invention, the program code generates cloud resource-monitoring policies, based on the resources of the cloud resources 410 (FIG. 4) that are insured. In an embodiment of the present invention, the program code generates log-collection policies from the insured resources.

In an embodiment of the present invention, the determining the cloud monitoring parameters include generating a cloud monitoring policy using a pre-defined template for the risks, like the templates discussed earlier. The injection of these parameters may include distributing the cloud monitoring policy to the respective monitoring tools (server monitoring, network monitoring, storage monitoring, etc.). The parameters may include a log collection policy that encompasses both the physical and software-defined resources of the infrastructure that are relevant to the insurance contract. The program code would generate the log collection policy using the pre-defined template for the risks and distribute the log collection policy to the respective log/event collection tools.

Below is an example of a data collection policy that is generated and implemented by the program code in an embodiment of the present invention:

target resource: all network elements (physical & software-defined) that are used by the CRM business application metrics: availability frequency of collection: every 15 mins summarization: hourly persistence: for 6 months Below is an example of a log collection policy that is generated and implemented by the program code in an embodiment of the present invention:

target resource: all network elements (physical & software-defined) that are used by all the CRM business application metrics: SNMP events that describe the availability of the network elements (along with time-stamp)

frequency of collection: every 15 mins persistence: for 6 months.

Figure 7:
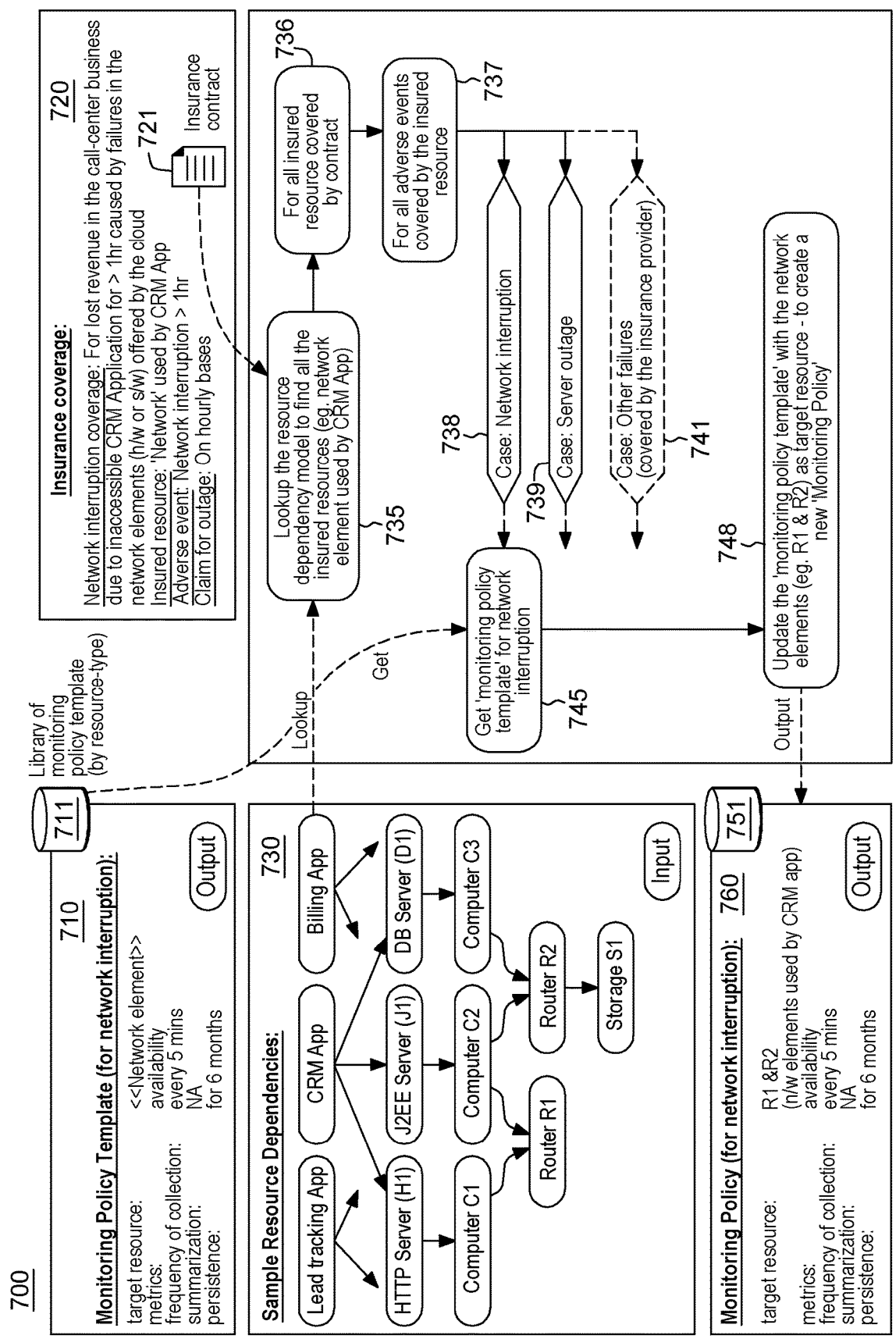
FIG. 7 depicts certain aspects of an embodiment of the present invention.

FIG. 7 illustrates aspects of an embodiment of the present invention where program code automates the generation and injection of the cloud-monitoring policies into the cloud monitoring tool, in order to collect relevant IT data (describing the cloud resources/services) based on coverage identified an insurance contract.

As seen in FIG. 7, insurance coverage 720 is defined by an insurance contract 721. A generic network monitoring policy 710 serves as a template in a library of monitoring policy templates 711. In this library 711, the templates are separated by resource-type, to provide one (non-limiting) example. Utilizing resource dependencies 730 within the computing system (including, but not limited to, a cloud computing system) the program code identifies the dependencies of the insured resources (735), based on these resources being covered by the insurance contract 721 (736), and are relevant to adverse events covered by the insurance contract 721 (737). The program code determines adverse situations where the insurance would be relevant, including, in this example, a network interruption (738), a server outage (739), and/or other failures (741). The program code gets the generic network monitoring policy 710 (745) and based on this policy and the cases generated by the program code, the program code updates the generic network monitoring policy 710 (748), generating a specific monitoring policy 760, based on the insurance contract 721 and the program code's analysis of the insured resources. The program code can utilize the specific monitoring policy 760 to update the library of monitoring policy templates 711, creating an updated library 751.

Returning to FIG. 5, in an embodiment of the present invention, the program code determines and injects risk management rules and/or configurations into the CMI 420 (FIG. 4) of the cloud computing environment 400 to tune the risk management tool in the CMI to collect data related to cloud resources 410 (FIG. 4) based on the insurance contract of a user (550). In order to determine and generate these configurations, in an embodiments of the present invention, the program code generates, based on the insurance contract, threshold rules for fault notification. The program code may also generate parameters for event-correlation. In an embodiment of the present invention, the program code validates the resource dependencies (such as, application-middleware-server-network dependencies) for completeness, correctness and readiness of failure analysis. The program code may also service dependencies (such as, application-business service, business transaction-application transaction) completeness, correctness and readiness for utilization in analysis module.

In an embodiment of the present invention, the risk management rules and/or configurations generated by the program code include different a combination of various rules and configurations. In an embodiment of the present invention the program code defines threshold rules for the monitoring data to raise events based on the failure criteria in the insurance contract. In an embodiment of the present invention, the program code generates event-correlation rules utilizing resource dependencies to assist in determining the root-cause of the failures that are listed in the insurance contract (based on the raw events from the resources and the resource dependency information). The program code may generate a fault-tree analysis with rules and constraints to utilize in determining the extent of failure of the insured resources, due to the failure-events that are listed in the insurance contract. In an embodiment of the present invention, the program code configures business service usage and accounting rules to determine the impact of failure due to the failure events listed in the insurance contract (e.g., using business service dependency and business transaction counting).

In an embodiment of the present invention, risk management rules and/or configurations include threshold rules generated using a policy-template. For example, for the network interruption insurance coverage, the program code can configure the following threshold rules for the cloud resources:

Cloud Resource: Network elements that are used by all the CRM business application Risk coverage: Network elements that are used by all the CRM business application Fault-notification rule template:

metrics: network availability & SNMP event log fault-trigger: If SNMP Event for [network elements used by CRM App] contains 'Link Down'; If network availability metrics for [network elements used by CRM Application] contains "device not responding' OR 'device general error' normal-trigger: If SNMP Event for the [network elements used by CRM App] contains 'Link Up'; If network availability metrics for the [network elements used by CRM App] contains "No Error'

In an embodiment of the present invention, the rules generated by the program code may also include event-correlation rules obtained using dependency information. Below is a sample of a cloud resource dependency:

CRM Application is dependent on {W1: WebSphere}, {D1: DB2}

W1 is dependent on {C1: Server}, D1 is dependent on {C2: Server},

C1, C2, are dependent on {S1: Storage},

C1, C2, S1 are dependent on {N1, N2, N3: Network}

Based on the above cloud resource dependency, the following event-correlation rules are generated: 1) If E(N1)&&(E(C1)||E (C2)||E (S1)||E(W1)||E(D1)||E(CRM)) then root-cause event is E(N1) (i.e., if there are error events from N1 and from any of CRM, W1, D1, C1, C2, S1, then the root-cause is the event from N1); 2) if E(C1)&&(E(W1)||E(CRM)) then root-cause event is E(C1) (i.e., if there are error events from C1 and from any of CRM, W1, then the root-cause is the event from C1).

Figure 6:
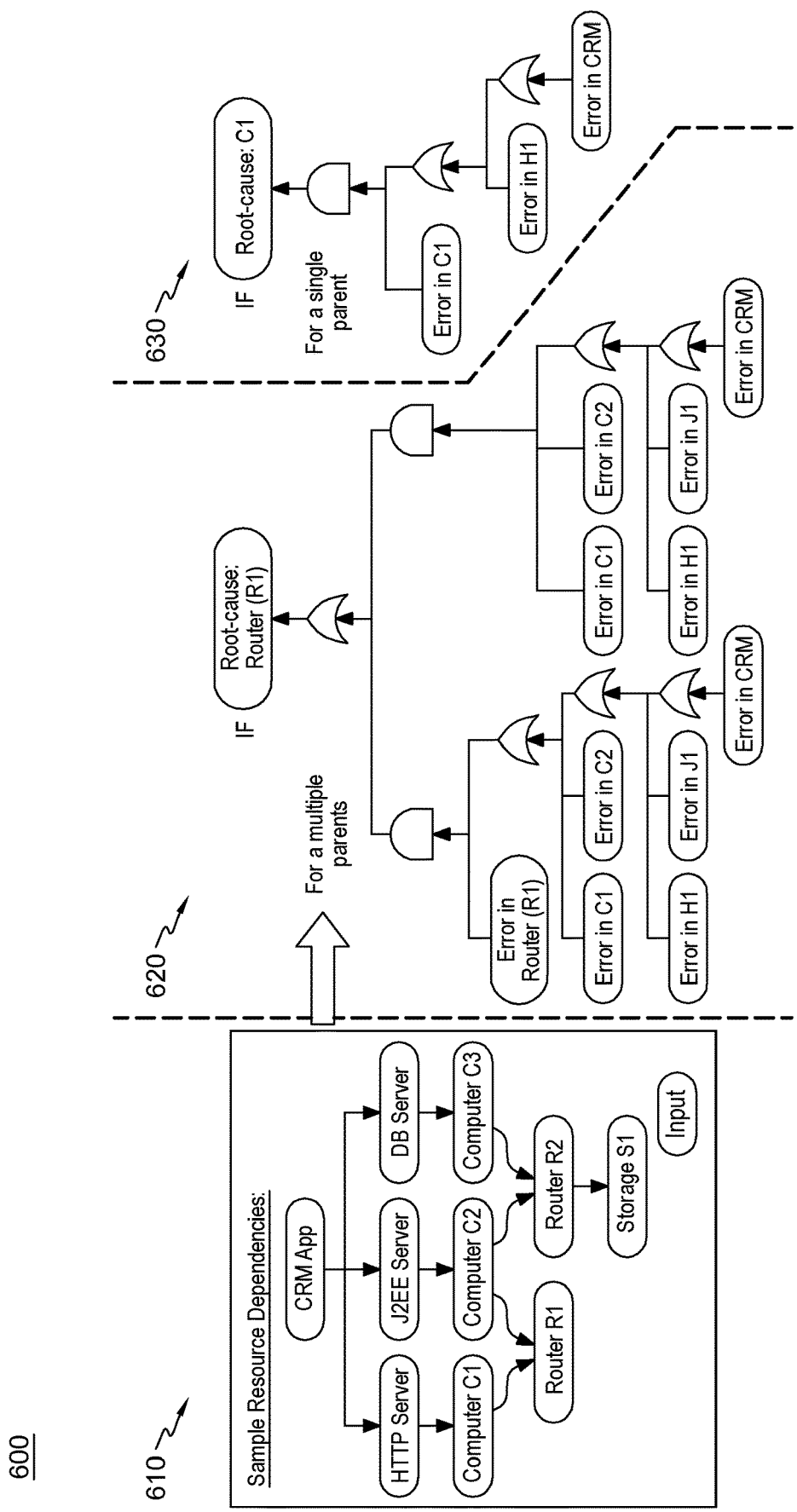
FIG. 6 depicts certain aspects of an embodiment of the present invention.

FIG. 6 provides an illustration 600 of how the program code generates event-correlation rules to determine a root cause based on resource dependencies. As illustrated in FIG. 6, the program code generates event-correlation rules (e.g., a Netcool/Impact Policy) using the resource dependency model for the target cloud 610 and business application. The program code configures root cause identification 620 with the event-correlation rules to isolate the failed resource 630 in the cloud. Thus, FIG. 6 illustrates the root-cause analysis of the multiple failure events and identifies a few failed cloud resource that affected business.

In embodiments of the present invention, the program code may generate fault tree analysis rules based on business dependencies. In a sample business dependency, Call-Center Business Service (B1) is offered to a customer using the CRM Application (A1), Billing Application (A2) and Lead tracking Application (A3). Sales Business Service (B2) is also dependent on the A1. A1 is dependent on {W1: WebSphere}, {D1: DB2}. D1 is shared by A1 and A3. Based on this business service dependency, the program code generates the following fault-tree analysis rule: If E(D1), then B1 & B2 are affected (i.e., if there are error in D1, A1 and A3 are affected, which in turn affects the B1 & B2).

In an embodiment of the present invention, the program code generates business service usage and accounting rules to assist in determining business impacts. For example a business service model with a business impact include: the business impact of a failed Call-Center Business Service (B1) XX$ per hour, the business impact of a failed Sales Business Service (B2) is YY$ per hour, and the business impact of a repeated (2-times) failed business transaction for B1 is ZZ$ per customer. Based on the above business service usage and accounting rules, the program code performs a failure impact analysis.

Returning to FIG. 5, in an embodiment of the present invention, based on the parameters and configurations, the program code utilizes the CMI to continuously monitor data collection and risk analytics to detect failures that are relevant for the established insurance contract (560). Because the program code has already tuned the CMI to collect data relevant to the insured resources, the program code can access the relevant information directly rather than filter the information to locate information relevant to an insured resource. In embodiment of the present invention, the monitoring includes the program code utilizing the monitoring policy to collect key metrics from the cloud resources 410 (FIG. 4), including the physical infrastructure and the software defined infrastructure relevant to the insurance contract. The program code may also collect and maintain relevant logs from the cloud resources 410 (FIG. 4) relevant to the insurance contract based on the policy defined. In an embodiment of the present invention, the program code analyzes the metrics and/or the logs in real-time to detect and respond to events (i.e., failures and deviations defined by the insurance contract).

In an embodiment of the present invention, the monitoring and collection of key metrics from the physical and software-defined infrastructure of the cloud resource 410 (FIG. 4) covered by the insurance policy includes monitoring the availability metrics of the infrastructure, the performance metrics of the infrastructure, and/or the capacity-related metrics of the infrastructure. In an embodiment of the present invention, the program code collects and maintains the relevant logs from the cloud resources 410 (FIG. 4) based on the log collection policy defined by the program code. The logs may include, but are not limited to: health events from the infrastructure, health audit performed on the PI/SDI, and/or configuration changes made to the infrastructure (during maintenance). In an embodiment of the present invention, the program code analyzes data streams in real-time to raise an alarm/event for a failure and/or deviation as per the insurance contract.

Figure 8:
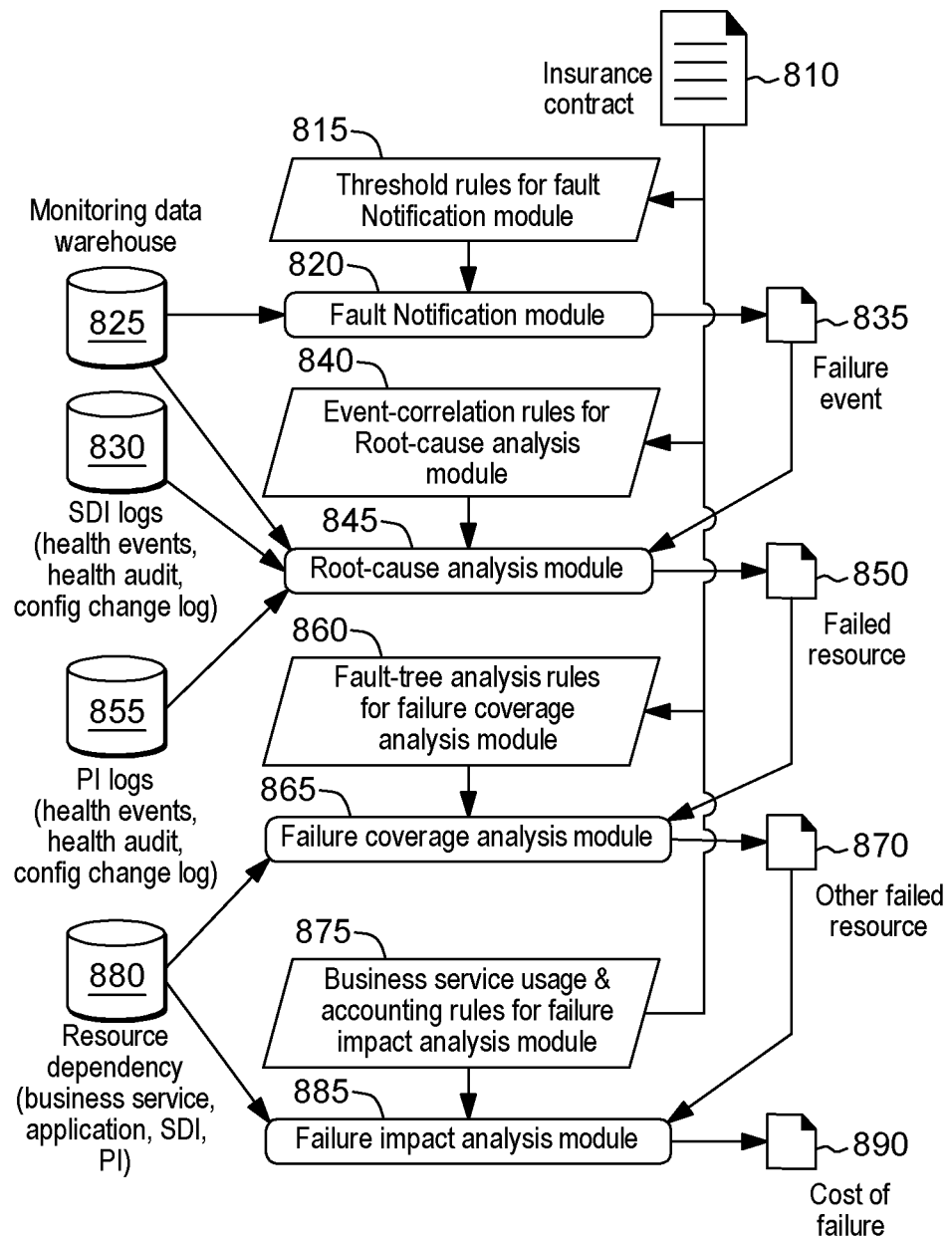
FIG. 8 depicts certain aspects of an embodiment of the present invention.

FIG. 8 provides an overview 800 of how the program code, in an embodiment of the present invention, generate the threshold rules and configurations for risk analysis, based on the risks protected by the insurance contract. For ease of understanding, aspects of the present invention in FIG. 8 are presented as separate entities or modules. However, these aspects can be combined into shared virtual and/or physical computing components. The separation is just offered for ease of understanding.

As illustrated in FIG. 8, from an insurance contract 810, program code obtains threshold rules for fault for a notification module 815, which includes the program code that would alert a user or entity if a threshold were exceeded. The program code retains the threshold rules in the fault notification module 820. The fault notification module 820 utilizes the data collected by monitoring a data in a warehouse 825 (which collects data relevant to the insurance contract) to determine when a failure event 835 has occurred, based on the threshold conditions being met.

In an embodiment of the present invention, the program code utilizes the insurance contract 810 to generate event-correlation rules 840 for, in this embodiment, a root cause analysis module 845. The root cause analysis module 845 monitors and/or periodically pulls data from physical infrastructure logs 855, software-defined infrastructure logs 830, and the data from data monitoring 825, and reports a failed resource 850 related to the failure event 835.

In an embodiment of the present invention, the program code generates fault-tree analysis rules 860 from the insurance contract 810 for use by program code in the failure coverage analysis module 865, which analyzes resource dependencies 880 to determine other failed resources 870 related to the failure event 835 based on dependencies with the failed resource 850.

In an embodiment of the present invention, the program code generates business service and accounting rules 875 based on the insurance contract 810, which is utilized by program code in a failures impact analysis module 885 to determine the cost of the failure 890, which is also based on resource dependencies 880.

Returning to FIG. 5, based on the CMI detecting an event, the program code obtains the event details from the CMI (570). In an embodiment of the present invention, when the CMI detects an event, one or more programs in the CMI initiate recovery procedures for high availability and disaster recovery, which may include backing the logs from the cloud resources 410 (FIG. 4), both physical and software-defined, for detailed analysis, notifying the administrators, triggering the automated recovery services, and monitoring the cloud resources 410 (FIG. 4) during recovery. In an embodiment of the present invention, the program code analyzes the collected data to determine the root-cause of failure (e.g., a network and/or routing issue) and generates a report.

The program code analyzes the event data to determine the extent of failure and impact of failure (580). In an embodiment of the present invention, determining the extent of a failure indicated by the event data includes assessing affected resources (e.g., virtual machines and storage due to the network issue), validating the assessment, and preparing a report.

As noted above, in an embodiment of the present invention, the program code assesses the extent of failure (e.g., business service due to the network interruption issue) and prepare a report. In one example, the program code has determined certain business dependencies exist: a Call-Center Business Service (B1) is offered to a customer using the CRM Application (A1), Billing Application (A2) & Lead tracking Application (A3); Sales Business Service (B2) is also dependent on the A1; A1 is dependent on {W1: WebSphere}, {D1: DB2}; D1 is shared by A1 and A3; D1 is dependent on {C2: Server}, {S1: Storage}; C2, S1 are dependent on {N1, N2: Network}. Based on the above business service dependency, the program code determined the following fault-tree analysis rules: if E(N1), then B1 & B2 are affected (i.e., if there are errors in N1, then C2, S1, D1, A1 and A3 are affected, which in turn affects the B1 and B2). When the program code obtains an event (e.g., indication of a failure) the program code assesses the impact the failure (e.g., affected business application and/or services due to a network issue) and prepares a report. In this example, the program code can determine that the business impact of a failed Call-Center Business Service (B1) is XX$ per hour, the business impact of a failed Sales Business Service (B2) is YY$ per hour, and the business impact of a repeated (2-times) failed business transaction for B1 is ZZ$ per customer. The program code can analyze the impacts of the failure.

The program code consolidates the results of the analysis with relevant raw data to prepare a claim package (590). In an embodiment of the present invention, the claim package may include, but is not limited to, failure details (with reference to the appropriate underwriting in the insurance contract), the root-cause of failure (with the proof of failure), extent of failure in the software defined resources (with the proof of failure), impact of failure in the higher-level services and solution, details about a periodic health-audit (from the authorized/approved agency), and/or details about any (approved/unapproved) configuration change made during preventive/corrective maintenance.

Figure 9:
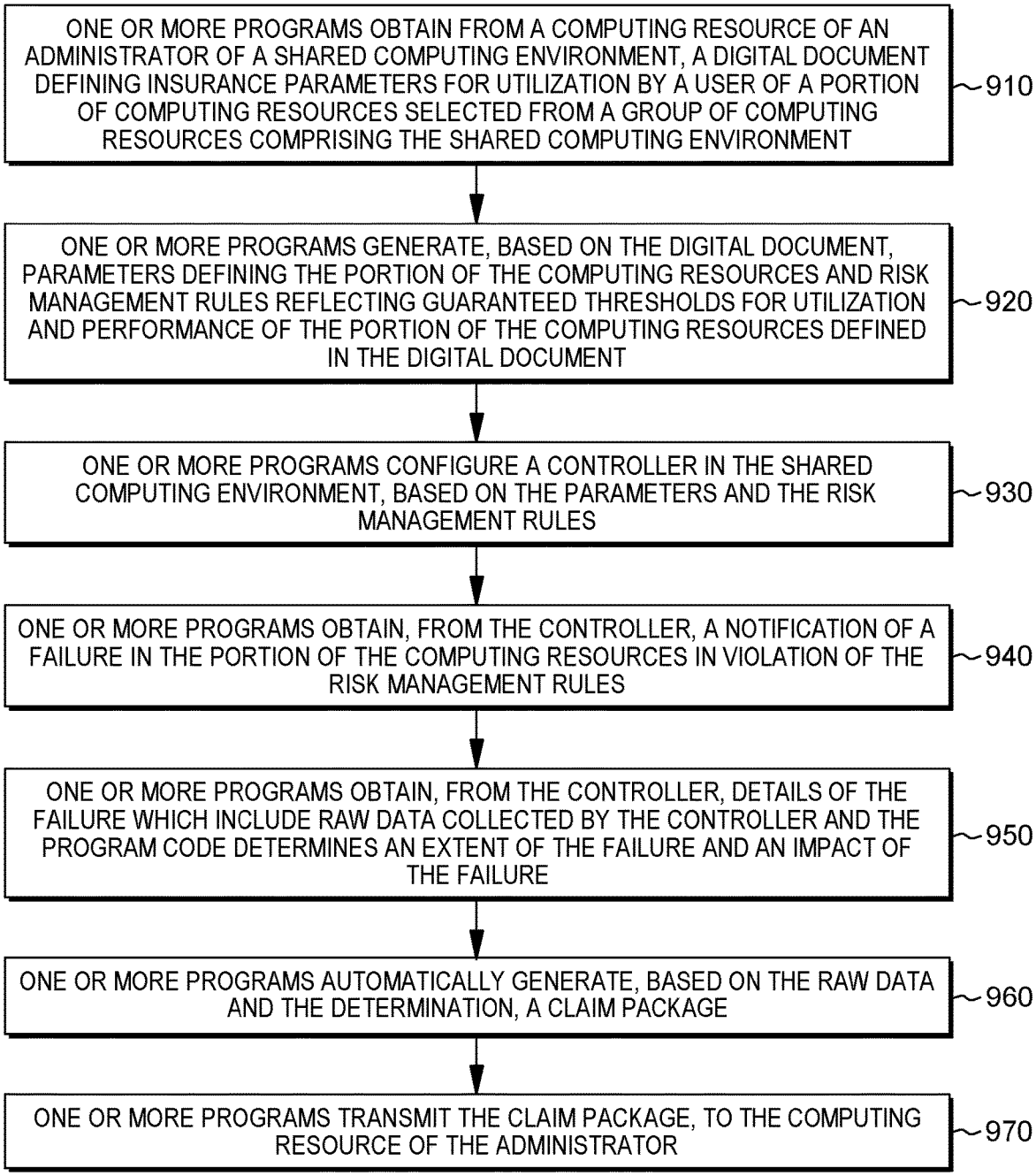
FIG. 9 depicts a workflow illustrating certain aspects of an embodiment of the present invention.

FIG. 9 is a workflow 900 that illustrates certain aspects of an embodiment of the present invention. As illustrated in FIG. 9, the program code obtains from a computing resource of an administrator of a shared computing environment, a digital document defining insurance parameters for utilization by a user of a portion of computing resources selected from a group of computing resources comprising the shared computing environment (910). In an embodiment of the present invention, the portion of the computing resources includes physical infrastructure and software-defined infrastructure. In an embodiment of the present invention, the shared computing environment includes a cloud computing environment.

The program code generates, based on the digital document, parameters defining the portion of the computing resources and risk management rules reflecting guaranteed thresholds for utilization and performance of the portion of the computing resources defined in the digital document (920). In an embodiment of the present invention, generating parameters and defining risk management rules further includes: the program code defining a scope of use for each computing resource of the portion of computing resources, based on the digital document, the program code implementing the defined scopes in the parameters, the program code defining, for each computing resource of the portion of computing resources, a risk profile, wherein the risk profile automatically detects failures in the computing resource when implemented by the controller of the shared computing environment, and the program code implementing the defined risk profiles in the risk management rules. In an embodiment of the present invention, defining the scope of use for each computing resource of the portion of computing resources further comprises: the program code determining dependencies between each computing resource and each other computing resource of the portion of the computing resources, the program code defining services executed by the user on the portion of the computing resources, and the program code mapping each service of the services to at least one computing resource of the portion of computing resources. In an embodiment of the present invention, determining the extent of the failure and the impact of the failure comprises: the program code identifying, based on analyzing the dependencies, which computing resources of the portion of computing resources were affected by the failure, and based on identifying the computing resources affected by the failure, the program code determining which services were affected by the failure. In an embodiment of the present invention, determining an extent of the failure and the impact of the failure comprises the program code applying at risk management rules selected from the group consisting of: threshold rules for the monitoring data to raise events based on a failure, event-correlation rules utilizing the dependencies to assist in determining a root-cause of the failures, and a fault-tree analysis with rules and constraints to utilize in determining an extent of the failure, and service usage rules to determine the impact of the failure utilizing the services.

The program code configures a controller in the shared computing environment, based on the parameters and the risk management rules (930). Based on this configuring, the controller continuously collects data and monitors operations from the portion of the computing resources and the controller determine whether a failure has occurred in the portion of the computing resources, based on the risk management rules. In an embodiment of the present invention, the data collected by the controller is selected from a group consisting of: configuration audits performed on the portion of the computing resources, health events from the portion of the computing resources, and configuration changes made to the portion of the computing resources.

The program code obtains, from the controller, a notification of a failure in the portion of the computing resources in violation of the risk management rules (940). The program code obtains, from the controller, details of the failure which include raw data collected by the controller and the program code determines an extent of the failure and an impact of the failure (950). In an embodiment of the present invention, obtaining the notification includes the program code receiving, from the controller, data from logs of the (insured) portion of the computing resources.

The program code automatically generates, based on the raw data and the determination, a claim package (960). The program code transmits the claim package, to the computing resource of the administrator (970).

In an embodiment of the present invention, the program code also analyzes raw data from the data collected by the controller and determines, by the one or more processors, based on the raw data, a root cause of the failure.

In an embodiment of the present invention, the program code automatically generates a report detailing the root cause (of the failure), and the program code transmits the report to the administrator.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
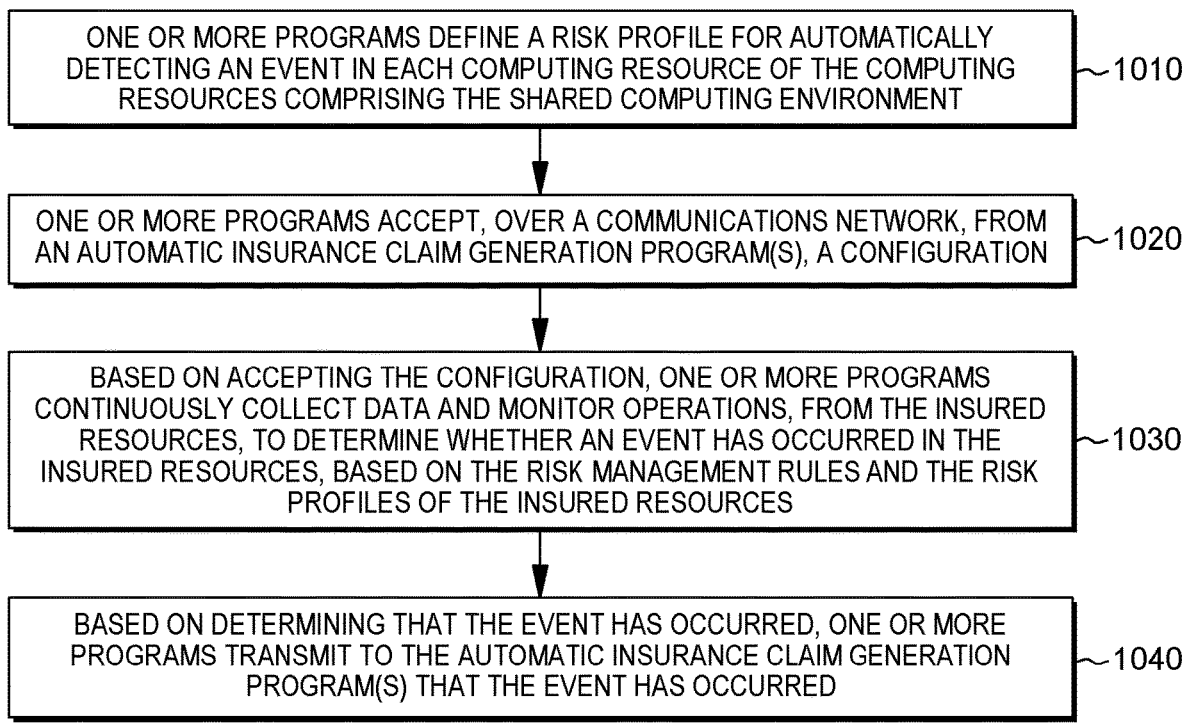
FIG. 10 depicts a workflow illustrating certain aspects of an embodiment of the present invention.

FIG. 10 is a workflow 1000 that illustrates certain aspects of an embodiment of the present invention. As illustrated in FIG. 10, program code executed by one or more processing resources in a shared computing environment, defines a risk profile for automatically detecting an event in each computing resource of the computing resources comprising the shared computing environment (1010). In an embodiment of the present invention, the shared computing environment comprises a cloud computing environment and the program code comprises a controller of the cloud computing environment.

The program code accepts, over a communications network, from one or more programs of an automatic insurance claim generation software, a configuration (1020). The configuration includes parameters identifying a portion of the computing resources of the shared computing environment comprising insured resources of a given user of the shared computing environment, and risk management rules reflecting guaranteed thresholds for utilization and performance of the portion of the computing resources.

Based on accepting the configuration, the program code continuously collects data and monitors operations, from the insured resources, to determine whether an event has occurred in the insured resources, based on the risk management rules and the risk profiles of the insured resources (1030). In an embodiment of the present invention, the continuously collecting the data includes the program code collecting data selected from the group consisting of: configuration audits performed on the portion of the computing resources, health events from the portion of the computing resources, and configuration changes made to the portion of the computing resources.

Based on determining that the event has occurred, the program code transmits to the one or more programs, a notification that the event has occurred (1040). The notification includes a portion of the data collected by the program code, where the portion includes details of the event.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
obtaining, by one or more processors, from a computing resource of an administrator of a computing environment, a digital document defining parameters for utilization, by a user, of a portion of computing resources, selected from a group of computing resources comprising the computing environment, wherein the portion of the computing resources comprises physical infrastructure and software-defined infrastructure, wherein the physical infrastructure and software-defined infrastructure is provided as a service by the computing environment;
generating, by the one or more processors, based on the digital document, parameters defining the portion of the computing resources and risk management rules reflecting guaranteed thresholds for utilization and performance of the portion of the computing resources defined in the digital document, wherein the generating parameters and defining risk management rules further comprises:
  defining, by the one or more processors, a scope of use for each computing resource of the portion of computing resources, based on the digital document, comprising:
    determining, by the one or more processors, dependencies between each computing resource and each other computing resource of the portion of the computing resources;
    defining, by the one or more processors, services executed by the user on the portion of the computing resources; and
    mapping, by the one or more processors, each service of the services to at least one computing resource of the portion of computing resources;
  implementing, by the one or more processors, the defined scopes in the parameters;
  defining, by the one or more processors, for each computing resource of the portion of computing resources, a risk profile, wherein the risk profile detects failures in the computing resource when implemented by the controller of the computing environment; and
  implementing, by the one or more processors, the defined risk profiles in the risk management rules;
  configuring, by the one or more processors, a controller in the computing environment, wherein the controller comprises a resource that is local to the one or more processors, based on the parameters and the risk management rules to provide monitoring of the computing environment based on usage of the user of a portion of computing resources of the computing resources of the computing environment;
  based on the configuring, locally monitoring, by the controller, operations from the portion of the computing resources by collecting data from the portion of the computing resources;
  determining, by the controller, that a failure defined by the risk management rules has occurred in the monitored portion of the computing resources;
  obtaining, by the one or more processors, from the controller, a notification of a failure in the monitored portion of the computing resources in violation of the risk management rules, wherein the notification comprises data logs from the portion of the computing resources;
  obtaining, by the one or more processors, from the controller, details of the failure comprising data collected by the controller;
  determining, by the one or more processors, from the data collected by the controller and the dependencies between each computing resource and each other computing resource, an extent of the failure and an impact of the failure, wherein determining the extent of the failure comprises conducting a fault-tree analysis based on the dependencies between each computing resource and each other computing resource of the portion of the computing resources, wherein the fault-tree analysis identifies one or more resources in the portion of the computing resources impacted by the failure;
  recovering, by the one or more processors, the one or more resources in the portion impacted by the failure, and
  automatically tuning, by the one of more processors, the computing environment, based on determining the extended and the impact of the failure.

2. The computer-implemented method of claim 1, further comprising:
  generating, by the one or more processors, based on the data collected by the controller and the determination, a claim package, wherein the claim package comprises the extent of the failure the portion of the computing resources;
  transmitting, by the one or more processors, the claim package, to the computing resource of the administrator, wherein the failure is selected from the group consisting of: a failed resource, a failed event, a result of periodic health audit performed in the computing environment, an interruption due to a network or routing issue, and a configuration change implemented in at least one resource of the portion of the computing resources.

3. The computer-implemented method of claim 1, wherein determining the extent of the failure and the impact of the failure comprises:
  identifying, by the one or more processors, based on analyzing the dependencies, which computing resources of the portion of computing resources were affected by the failure; and
  based on identifying the computing resources affected by the failure, determining which services were affected by the failure.

4. The computer-implemented method of claim 3, wherein determining an extent of the failure and the impact of the failure further comprises applying at risk management rules selected from the group consisting of: threshold rules for the monitoring data to raise events based on a failure, and event-correlation rules utilizing the dependencies to assist in determining a root-cause of the failures.

5. The computer-implemented method of claim 1, wherein the data collected by the controller is selected from a group consisting of: configuration audits performed on the portion of the computing resources, health events from the portion of the computing resources, and configuration changes made to the portion of the computing resources.

6. The computer-implemented method of claim 1, wherein the obtaining the notification of the failure further comprises:
  receiving, from the controller, data from logs of the portion of the computing resources.

7. The computer-implemented method of claim 1, wherein the portion of the computing resources comprises physical infrastructure and software-defined infrastructure.

8. The computer-implemented method of claim 1, further comprising:
  analyzing, by the one or more processors, the data collected by the controller collected by the controller; and
  determining, by the one or more processors, based on the data collected by the controller and the dependencies between each computing resource and each other computing resource, a root cause of the failure.

9. The computer-implemented method of claim 1, further comprising:
  generating, by the one or more processors, a report detailing the root cause; and
  transmitting, by the one or more processors, the report to the administrator.

10. The computer-implemented method of claim 1, wherein the computing environment comprises a shared computing environment.

11. The computer-implemented method of claim 10, wherein the shared computing environment comprises a cloud computing environment.

12. The computer-implemented method of claim 11, wherein the data collected by the controller comprises raw data.

13. A computer program product comprising:
a computer readable storage medium readable by one or more processors and storing instructions for execution by the one or more processors for performing a method comprising:
obtaining, by the one or more processors, from a computing resource of an administrator of a computing environment, a digital document defining parameters for utilization, by a user, of a portion of computing resources, selected from a group of computing resources comprising the computing environment, wherein the portion of the computing resources comprises physical infrastructure and software-defined infrastructure, wherein the physical infrastructure and software-defined infrastructure is provided as a service by the computing environment;
generating, by the one or more processors, based on the digital document, parameters defining the portion of the computing resources and risk management rules reflecting guaranteed thresholds for utilization and performance of the portion of the computing resources defined in the digital document, wherein the generating parameters and defining risk management rules further comprises:
defining, by the one or more processors, a scope of use for each computing resource of the portion of computing resources, based on the digital document, comprising:
determining, by the one or more processors, dependencies between each computing resource and each other computing resource of the portion of the computing resources;
defining, by the one or more processors, services executed by the user on the portion of the computing resources; and
mapping, by the one or more processors, each service of the services to at least one computing resource of the portion of computing resources;
implementing, by the one or more processors, the defined scopes in the parameters;
defining, by the one or more processors, for each computing resource of the portion of computing resources, a risk profile, wherein the risk profile detects failures in the computing resource when implemented by the controller of the computing environment; and
implementing, by the one or more processors, the defined risk profiles in the risk management rules;
configuring, by the one or more processors, a controller in the computing environment, wherein the controller comprises a resource that is local to the one or more processors, based on the parameters and the risk management rules to provide monitoring of the computing environment based on usage of the user of a portion of computing resources of the computing resources of the computing environment;
based on the configuring, locally monitoring, by the controller, operations from the portion of the computing resources by collecting data from the portion of the computing resources;
determining, by the controller, that a failure defined by the risk management rules has occurred in the monitored portion of the computing resources;
obtaining, by the one or more processors, from the controller, a notification of a failure in the monitored portion of the computing resources in violation of the risk management rules, wherein the notification comprises data logs from the portion of the computing resources;
obtaining, by the one or more processors, from the controller, details of the failure comprising data collected by the controller;
determining, by the one or more processors, from the data collected by the controller and the dependencies between each computing resource and each other computing resource, an extent of the failure and an impact of the failure, wherein determining the extent of the failure comprises conducting a fault-tree analysis based on the dependencies between each computing resource and each other computing resource of the portion of the computing resources, wherein the fault-tree analysis identifies one or more resources in the portion of the computing resources impacted by the failure;
recovering, by the one or more processors, the one or more resources in the portion impacted by the failure;
automatically tuning, by the one of more processors, the computing environment, based on determining the extended and the impact of the failure.

14. The computer program product of claim 13, wherein determining the extent of the failure and the impact of the failure comprises:
identifying, by the one or more processors, based on analyzing the dependencies, which computing resources of the portion of computing resources were affected by the failure; and
based on identifying the computing resources affected by the failure, determining which services were affected by the failure.

15. The computer program product of claim 14, wherein determining an extent of the failure and the impact of the failure further comprises applying at risk management rules selected from the group consisting of: threshold rules for the monitoring data to raise events based on a failure, and event-correlation rules utilizing the dependencies to assist in determining a root-cause of the failures.

16. The computer program product of claim 13, wherein the data collected by the controller is selected from a group consisting of: configuration audits performed on the portion of the computing resources cloud resources, health events from the portion of the computing resources, and configuration changes made to the portion of the computing resources.

17. The computer program product of claim 13, wherein the obtaining the notification of the failure further comprises:
receiving, from the controller, data from logs of the portion of the computing resources.

18. The computer program product of claim 13, wherein the portion of the computing resources comprise physical infrastructure and software-defined infrastructure.

19. The computer program product of claim 13, the method further comprising:

generating, by the one or more processors, based on the data collected by the controller and the determination, a claim package, wherein the claim package comprises the extent of the failure the portion of the computing resources;

transmitting, by the one or more processors, the claim package, to the computing resource of the administrator, wherein the failure is selected from the group consisting of: a failed resource, a failed event, a result of periodic health audit performed in the computing environment, an interruption due to a network or routing issue, and a configuration change implemented in at least one resource of the portion of the computing resources.

20. A system comprising:

a memory;

one or more processors in communication with the memory; and program instructions executable by the one or more processors via the memory to perform a method, the method comprising:

obtaining, by the one or more processors, from a computing resource of an administrator of a computing environment, a digital document defining parameters for utilization, by a user, of a portion of computing resources, selected from a group of computing resources comprising the computing environment, wherein the portion of the computing resources comprises physical infrastructure and software-defined infrastructure, wherein the physical infrastructure and software-defined infrastructure is provided as a service by the computing environment;

generating, by the one or more processors, based on the digital document, parameters defining the portion of the computing resources and risk management rules reflecting guaranteed thresholds for utilization and performance of the portion of the computing resources defined in the digital document, wherein the generating parameters and defining risk management rules further comprises:

defining, by the one or more processors, a scope of use for each computing resource of the portion of computing resources, based on the digital document, comprising:

determining, by the one or more processors, dependencies between each computing resource and each other computing resource of the portion of the computing resources;

defining, by the one or more processors, services executed by the user on the portion of the computing resources; and mapping, by the one or more processors, each service of the services to at least one computing resource of the portion of computing resources;

implementing, by the one or more processors, the defined scopes in the parameters;

defining, by the one or more processors, for each computing resource of the portion of computing resources, a risk profile, wherein the risk profile detects failures in the computing resource when implemented by the controller of the computing environment; and implementing, by the one or more processors, the defined risk profiles in the risk management rules;

configuring, by the one or more processors, a controller in the computing environment, wherein the controller comprises a resource that is local to the one or more processors, based on the parameters and the risk management rules to provide monitoring of the computing environment based on usage of the user of a portion of computing resources of the computing resources of the computing environment;

based on the configuring, locally monitoring, by the controller, operations from the portion of the computing resources by collecting data from the portion of the computing resources;

determining, by the controller, that a failure defined by the risk management rules has occurred in the monitored portion of the computing resources;

obtaining, by the one or more processors, from the controller, a notification of a failure in the monitored portion of the computing resources in violation of the risk management rules, wherein the notification comprises data logs from the portion of the computing resources;

obtaining, by the one or more processors, from the controller, details of the failure comprising data collected by the controller;

determining, by the one or more processors, from the data collected by the controller and the dependencies between each computing resource and each other computing resource, an extent of the failure and an impact of the failure, wherein determining the extent of the failure comprises conducting a fault-tree analysis based on the dependencies between each computing resource and each other computing resource of the portion of the computing resources, wherein the fault-tree analysis identifies one or more resources in the portion of the computing resources impacted by the failure;

recovering, by the one or more processors, the one or more resources in the portion impacted by the failure; and automatically tuning, by the one of more processors, the computing environment, based on determining the extended and the impact of the failure.

\* \* \* \* \*